United States Patent [19]

Franz et al.

[11] Patent Number: 5,252,971
[45] Date of Patent: Oct. 12, 1993

[54] DATA ACQUISITION IN A MULTI-FUNCTION KEYBOARD SYSTEM WHICH CORRECTS FOR PRELOADING OF FORCE SENSORS

[75] Inventors: Patrick J. Franz, Portland; Philip D. Biehl, Tigard, both of Oreg.

[73] Assignee: Home Row, Inc., Clackamas, Oreg.

[21] Appl. No.: 672,641

[22] Filed: Mar. 18, 1991

Related U.S. Application Data

[63] Continuation-in-part of Ser. No. 557,546, Jul. 24, 1990, and a continuation-in-part of Ser. No. 649,711, Feb. 1, 1991, Pat. No. 5,189,403, and a continuation-in-part of Ser. No. 412,680, Sep. 26, 1989, Pat. No. 5,124,689.

[51] Int. Cl.$^5$ ............... H03K 17/967; H03M 11/06; H03M 11/20; H01H 25/04
[52] U.S. Cl. ............................. 341/26; 341/34; 200/6 A; 345/168
[58] Field of Search .................. 341/22, 26, 34, 29, 341/33; 340/706, 708, 709, 710, 711; 400/481, 485; 364/709.12, 709.15, 709.16; 200/6 A; 338/114

[56] References Cited

U.S. PATENT DOCUMENTS

| | | | |
|---|---|---|---|
| 3,950,743 | 4/1976 | Hatano et al. | 341/26 |
| 4,029,915 | 6/1977 | Ojima | 200/6 A |
| 4,163,204 | 7/1979 | Sado et al. | 338/114 |
| 4,305,135 | 12/1981 | Dahl et al. | 341/33 |
| 4,451,895 | 5/1984 | Sliwkowski | 340/708 |
| 4,680,577 | 7/1987 | Straayer et al. | 340/711 |
| 4,706,068 | 11/1987 | Eberhard | 400/485 |
| 4,821,013 | 4/1989 | Iida | 338/114 |
| 4,862,166 | 8/1989 | Yamakawa | 341/22 |
| 4,896,290 | 1/1990 | Rhodes et al. | 340/711 |
| 4,937,778 | 7/1990 | Wolf et al. | 341/26 |
| 5,007,008 | 4/1991 | Beers | 341/22 |
| 5,036,321 | 7/1991 | Leach et al. | 341/33 |

OTHER PUBLICATIONS

"Single Keybutton Four-Way Switch", IBM Technical Disclosure Bulletin, vol. 21, No. 8, Jan. 1979, p. 3261.
"Single Key Cursor Control", IBM Technical Disclosure Bulletin, vol. 26, No. 7B, Dec. 1983, pp. 3746–3747.
"Smart Key", IBM Technical Disclosure Bulletin, vol. 28, No. 5, Oct. 1985, pp. 1859–1860.

Primary Examiner—Donald J. Yusko
Assistant Examiner—John E. Giust
Attorney, Agent, or Firm—Marger, Johnson, McCollom & Stolowitz

[57] ABSTRACT

Data acquisition in a multi-function keyboard system includes both acquiring typing data by conventional keyboard scanning techniques and, simultaneously, acquiring pointing data by sampling force sensors coupled to the multi-function pointing key. The keyboard system periodically samples the force sensors to determine bias values defining a null point, and updates the bias values by a moving average calculation to compensate for manufacturing tolerance and long term drift. In response to a start pointing command from the host processor, the keyboard system transmits bias values and then pointing values, the latter being responsive to forces applied to the pointing key by the user for cursor control. The sensor values are encoded so as to pass through to the host processor in a manner transparent to application software. The system scans the force sensors periodically to acquire successive pointing values, and transmits them to the host, as long as pointing mode persists. Concurrently, the keyboard system scans the keyboard to detect other key changes and forwards them to the host as well. The keyswitch data may be interpreted as a pointing event (analogous to a mouse button action), or as an indication to change to typing mode.

18 Claims, 9 Drawing Sheets

Figure 9

DATA ACQUISITION IN A MULTI-FUNCTION KEYBOARD SYSTEM WHICH CORRECTS FOR PRELOADING OF FORCE SENSORS

This application is a continuation-in-part of copending commonly-owned U.S. application Ser. No. 07/557,546 filed Jul. 24, 1990, and entitled KEYSWITCH INTEGRATED POINTING ASSEMBLY, the entirety of which is incorporated herein by this reference. This application also is a continuation-in-part of copending commonly-owned U.S. application Ser. No. 07/649,711 filed Feb. 1, 1991 and entitled INTEGRATED KEYBOARD AND POINTING DEVICE SYSTEM WITH AUTOMATIC MODE CHANGE, now U.S. Pat. No. 5,189,403 the entirety of which also is incorporated herein by this reference.

This application also is a continuation-in-part of copending, commonly owned U.S. patent application Ser. No. 07/412,680 filed Sep. 26, 1989 now U.S. Pat. No. 5,124,689, the entirely of which is incorporated herein by this reference.

BACKGROUND OF THE INVENTION

An integrated keyboard and pointing device system allows a computer user to move a screen cursor smoothly in any direction by pushing on an existing key on the keyboard in whatever direction the cursor is desired to go. U.S. Pat. No. 4,680,577 to Straayer, et al. shows an example of a multipurpose cursor control keyswitch for that purpose.

Operation of an integrated multi-function keyboard system, i.e. a system that provides for both pointing and typing operations without requiring a separate pointing device such as a mouse, requires acquiring pointing data from the keyboard. In an integrated system, pointing data preferably is communicated from the keyboard to the host processor using a known, industry standard communications link between the keyboard and the host. What is needed is a way to communicate pointing data to the host, over that standard interface, in a manner transparent to application software.

SUMMARY OF THE INVENTION

An object of the invention is to acquire pointing data from a multi-function keyboard for controlling a cursor.

Another object of the invention is to transfer pointing data to a host processor in a manner compatible with known keyboard communication protocols and transparent to application software.

A further object of the invention is to monitor bias values in integrated keyboard force sensors, and update bias value information to automatically correct for aging of the force sensors.

A multi-function keyboard system according to the present invention generally includes the following components:

1. Force sensors are positioned under one or more keys of the of the keyboard. These force sensors pick up the XYZ forces on the keycap. The addition of these force sensors do not affect the operation or feel of the keyswitch.

2. Simple, low cost A/D conversion hardware is provided to convert the analog signals from the sensors to digital form for the keyboard microprocessor.

3. Additional keyboard software in or available to the keyboard microprocessor is provided to read the A/D hardware and send the resulting sensor data to the host computer.

4. Driver software on the host computer examines the keyboard data stream and uses key press/release information and the sensor data to emulate a mouse.

The foregoing and other objects, features and advantages of the invention will become more readily apparent from the following detailed description of a preferred embodiment which proceeds with reference to the drawings.

DETAILED DESCRIPTION OF A PREFERRED EMBODIMENT

Overview

An integrated keyboard for use in a multi-functional keyboard system includes an array of directional force sensors positioned under a selected one of the keys so as to form a pointing assembly. Preferably, the selected key is one of the usual typing keys on the home row (ASDF-JKL;) of the keyboard. Alternatively, a special key located alongside the usual array of typing keyswitches may be provided with force sensors exclusively for pointing, but such an arrangement is believed less efficient in use than the preferred arrangement.

The force sensors detect lateral (X and Y axes) and vertical (Z axis) forces applied to the keycap by a user. The addition of these force sensors do not affect the normal operation or feel of the keyswitch. Simple, low cost A/D conversion hardware is provided to convert the signals from the force sensors to digital form for the keyboard microprocessor. Additional software in or available to the keyboard microprocessor is provided to read the A/D hardware and send the resulting sensor data to the host computer. Driver software on the host computer then examines the keyboard data stream and uses the key press/release information and the sensor data to emulate a mouse.

Figure 1:
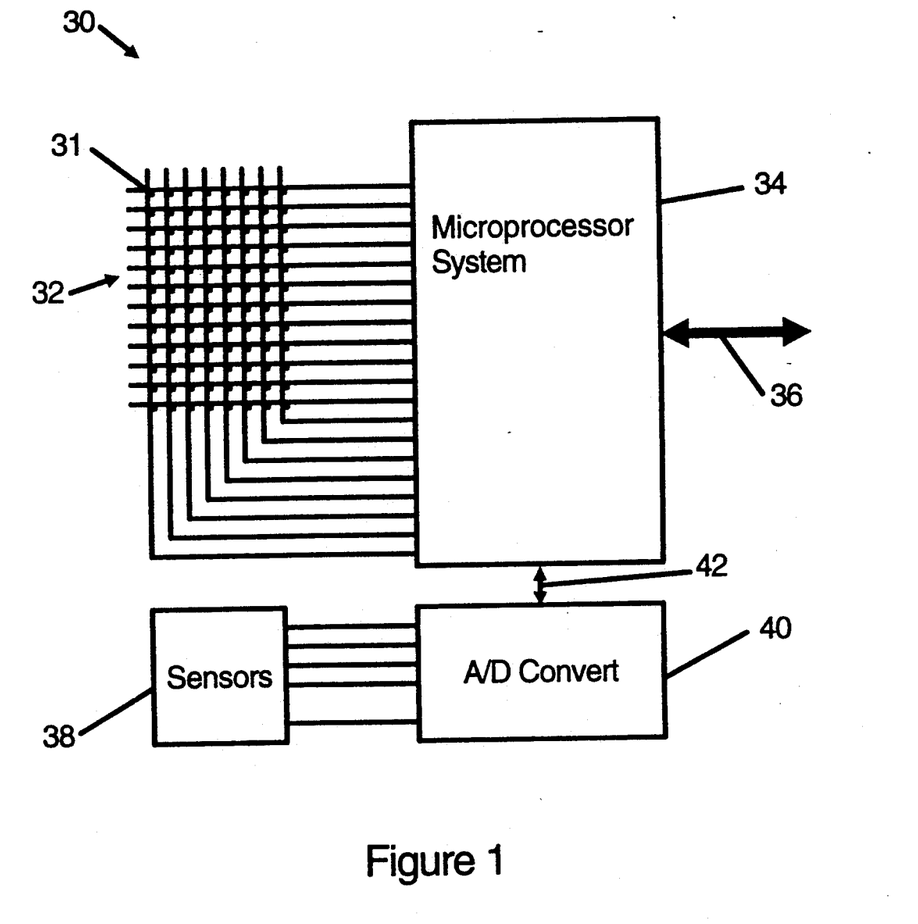
FIG. 1 is a block diagram of an integrated keyboard for input of pointing and typing data.

FIG. 1 is a block diagram of the keyboard hardware 30. It shows an array of keyswitches 32 coupled to a microprocessor system 34. 31 schematically indicates an example keyswitch. The microprocessor system, in turn, is coupled over a communication link 36 to a host processor (computer) as is conventional. Additionally, an array of force sensors 38 is connected to analog-to-digital (A/D) conversion means 40. The A/D converter, in turn, is connected over a bus 42 to the microprocessor. The force sensors, A/D converter and related hardware, and methods of acquiring pointing data using a keyboard of the type described are discussed in greater detail below.

Pointing Force Sensors

The J key preferably is used as the pointing key, as it is actuated by the right hand index finger in the usual typing position. The J key guide is isolated from other guides, and forces on the keycap are coupled through the force sensors to a reference structure. This reference structure is usually a base plate or PCB. The J key plunger still actuates the J key switch in the normal way.

Figure 2:
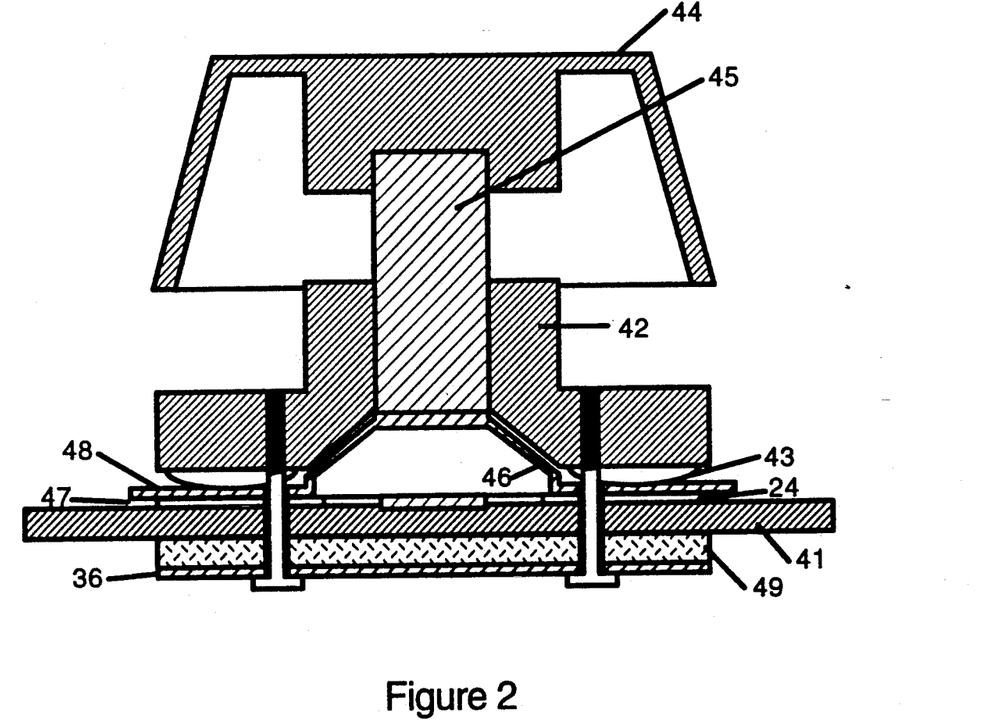
FIG. 2 is a cross-sectional view of a keyswitch-integrated pointing device for use in an integrated keyboard of the type illustrated in FIG. 1.

FIG. 2 illustrates in cross-section an example of a suitable keyswitch fitted with force sensors. A rigid actuator 42 includes a central aperture that serves as a plunger guide, and includes specially contoured actuator surfaces or "pads" 43 on its underside for transmitting forces applied to the keycap to force sensors. A keycap 44 includes a depending plunger 45 for actuating a rubber dome type switch assembly 46. A force sensor array 47 includes a force sensor located below each actuator surface to sense forces applied to the keycap by a user. A force distribution pad 48 is disposed between the actuator surfaces and the force sensors. A compressible pre-load pad 49 biases the sensors to a predetermined operating point. Additional details of a keyswitch integrated pointing assembly are disclosed in the copending application referenced above.

The force sensors may employ any of a variety of force sensing technologies. Examples include piezo and foil strain gauges, optical, magnetic and capacitive technologies. Force Sensing Resistors ("FSRs"), a new thick film contact technology, are preferred as they are easy to use, inexpensive, and provide a large output signal. FSRs comprise two plastic films, one with a conductive silver ink and one with a resistive carbon ink. The harder the films are pressed together, the lower the resistance. Resistances range from 500K Ohms to 5K Ohms. Since the FSRs are not repeatable under low forces ($<150$ grams), the useful range of resistances is limited to 20K to 5K (approximately 150 to 450 grams). FSRs are commercially available from Interlink Electronics, Inc. of California.

The FSR lays flat on the reference structure and the actuator pads press on four separate areas. This gives four orthogonal resistance signals proportional to the forces on the keycap. In some applications, the four areas are at 45 degree angles to the keyboard, so the signals have to be combined to get XY data.

The actuator is preloaded onto the force distribution pad, thereby biasing the FSR to a point on its force/resistance curve beyond the low force range where the FSR is unstable. In operation, forces applied by a user's finger cause some of the FSRs to be loaded beyond the preload point, and others to be unloaded below the preload point. The preload point is arranged so a approximately 100 g force on the keycap causes a maximum FSR unloading that takes it just to the FSR stability point.

Depending on the particular FSR, the shape of it's force/resistance curve may mean the region of instability, the preload point, and the operating range may be different. For some FSR configurations, the preload point is approximately 12K and the operating range is from 5K to 20K. For others, the curve is shifted upwards, so the preload point might be 30K, with an operating range of 100K to 10K. This is not a problem; the A/D component values just need to be adjusted accordingly for a particular FSR configuration.

The A/D Hardware

Figure 3:
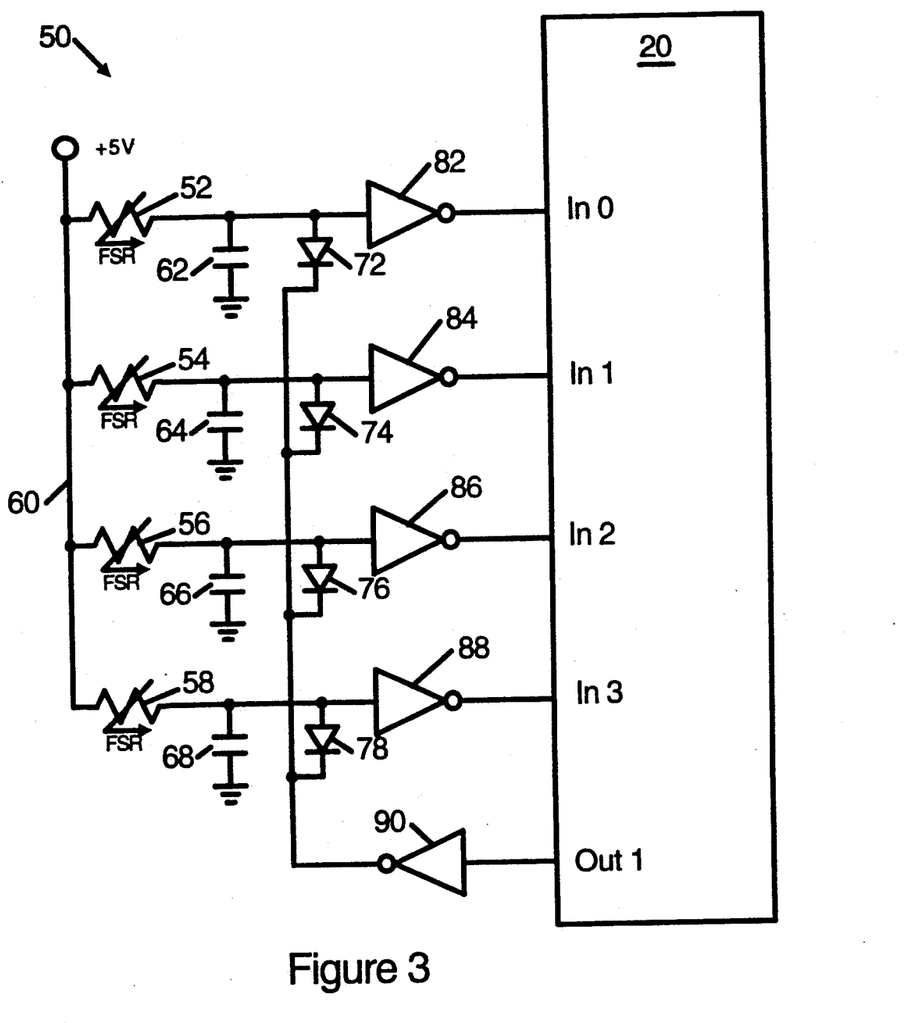
FIG. 3 is a schematic diagram of an array of force sensing resistors (FSRs) coupled to a keyboard microprocessor for implementing a charged-capacitor type of A/D conversion in an integrated keyboard.
Figure 4:
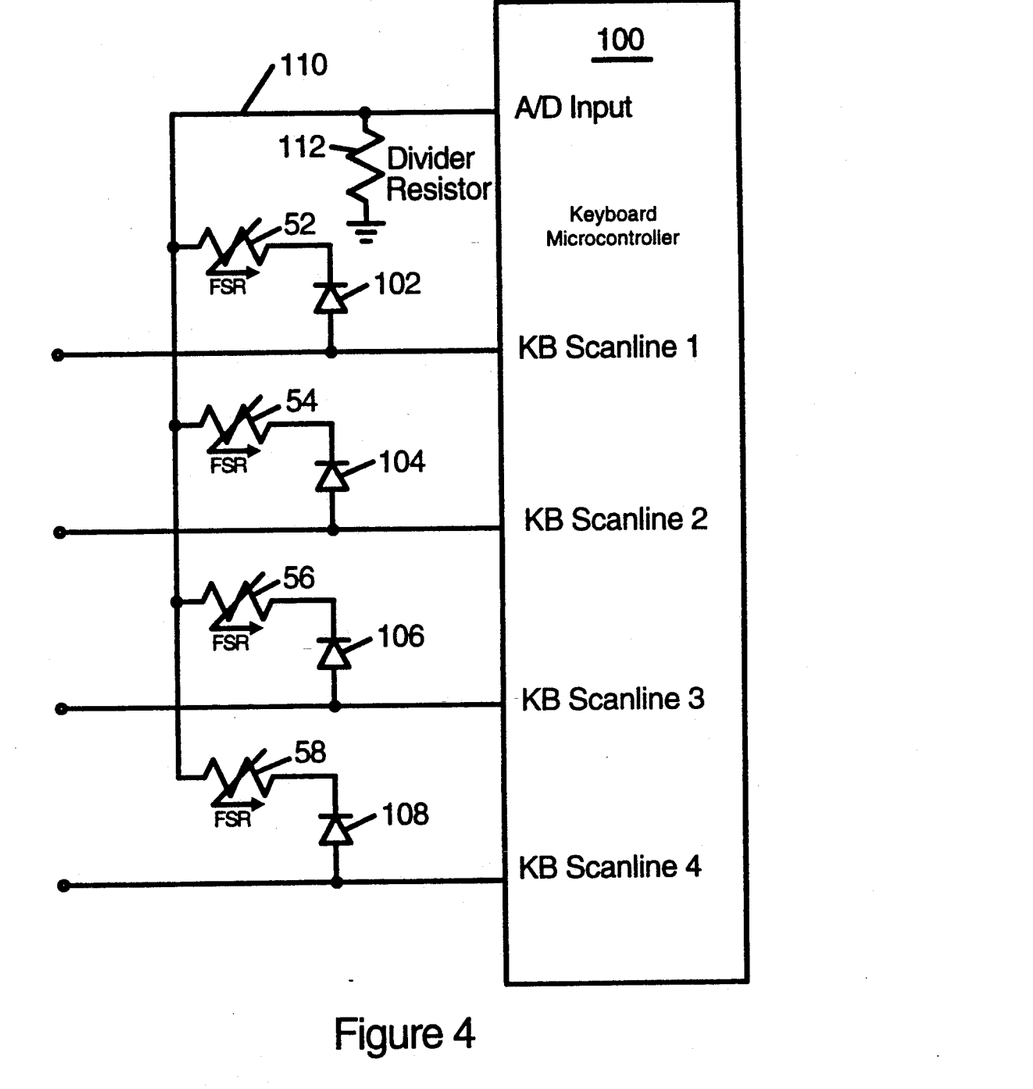
FIG. 4 is a schematic diagram of an array of FSRs coupled to a keyboard microprocessor system that includes an A/D converter for use in an integrated keyboard.

The A/D hardware requirements of the integrated keyboard system are easily met by many different schemes. One operative example of A/D conversion hardware is shown in FIG. 3, described below. A simpler alternative A/D circuit is shown in FIG. 4, for systems with a standard A/D converter in the keyboard microprocessor.

The general specifications for the "A/D" conversion required are:

1. Typical FSR resistance range to be converted: 5K to 20K. Actual range is a function of the particular FSR configuration.

2. 7 or 8 bit resolution.

3. 15 conversions/second on each of 4 channels. Three channels are sufficient in an appropriate configuration. A four-channel system may be designed to sense failure of one FSR and continue to operate using the remaining three FSRs.

4. Conversion linearity is not required, especially if 8 bit resolution is provided. FSRs are monotonic but strongly nonlinear, and extensive corrections may be done in host software. Additional correction due to the A/D conversion may be provided.

5. To reduce the size and cost of the FSR and keyboard substrate, it is best to have one side of each of the FSR sensors be connected in common (5 leads for 4 integrated sensors; 4 leads for 3 integrated sensors).

6. Part-to-part consistency needs to be within 10%.

7. Power consumption in operation must be low. Power consumption at idle must be extremely low for use in battery powered applications such as lap top or "notebook" computers.

Charged Capacitor A/D

FIG. 3 is a schematic diagram of an FSR sampling circuit 50, coupled to a keyboard processor 20 for A/D conversion. The basic concept of the sampling circuitry of FIG. 3 is that, for each FSR, a capacitor is charged through the resistance of the FSR. The amount of time required to charge the FSR to a threshold voltage is then measured by the keyboard processor. The charge time is proportional to the FSR resistance.

Referring to FIG. 3, each FSR 52, 54, 56, and 58 has one side coupled to a common node 60. Common node 60 is coupled to a predetermined bias voltage, for example +5 VDC. The other side of each FSR is coupled to a capacitor 62, 64, 66, and 68, respectively. Each capacitor is also coupled to the anode of a corresponding blocking diode 72, 74, 76, and 78, respectively, and to the input of a buffer which may be, for example, an inverter gate 82, 84, 86, 88. The output of each inverter/buffer is coupled to a corresponding data input In0, In1, In2, In3 of the processor 20. The cathodes of the blocking diodes are connected in common to another inverter 90, which is driven by a processor output terminal "Out 1".

In operation, all of the capacitors are discharged before each timing cycle to establish a known reference voltage on the capacitor. As shown, inverter 90 is used to discharge the capacitors via the blocking diodes.

Thus, there is an FSR, a capacitor, a diode, and a thresholding inverter for each channel. The inverter used to discharge the capacitors is shared by all four channels. Depending on the microprocessor used, the thresholding inverters may not be required. To reduce overall A/D time, it is important that the device used to discharge the capacitors have a low internal resistance. A simple transistor is sufficient.

In an operative example, the capacitors are 0.047uf, the FSR range is 5K to 20K ohms, and the maximum charge up time is 1 msec. The timing is done in the keyboard microprocessor software with a 2 instruction loop.

In the embodiment illustrated, there are four sensor channels, one for each of up, down, left, and right. If physical considerations prevent this configuration, host software takes care of creating an XY signal from whatever the sensor configuration may be. In an alternative arrangement, for instance, the FSR sensors are arranged in the four corners of the keyswitch cell, yielding northeast (NE), northwest (NW), southwest (SW), and southeast (SE) signals. We have also found that fewer than four sensors, for example three sensors arranged in a triangle, are adequate for acquiring pointing data. In that case, of course, only three sampling channels are required.

This circuitry is designed for low parts cost and minimal disruption in a standard keyboard application with an existing keyboard microprocessor. It provides adequate resolution at an adequate conversion rate. Five bits of a parallel I/O port on the keyboard microprocessor are required. An alternative arrangement using a timer on the microcontroller would use as little as two parallel port pins and one timer input. Note that using 5 port pins leaves 3 port pins remaining in a standard 8 bit port, sufficient to run a 3 to 8 line decoder, thus effectively allowing for replacement of the 5 pins used.

This circuitry is not ideal for low power operation unless the capacitors are very small because the charges on the capacitors are dumped before each cycle. If the capacitors are small, the time constant will be small and a high speed counter is needed to get adequate resolution. Note, though, that this circuitry only needs to be powered while the system is in pointing mode. The distinction between pointing and typing is explicit, so the sampling circuitry easily could be arranged to power up only when needed.

Microcontroller with Built In A/D

Many different sampling and A D conversion schemes, including the capacitor charging method described above, may be employed. Other techniques may be apparent to those skilled in the art in light of this disclosure. It is preferred, however, that a microcontroller with built-in A/D be used. Commercially available devices include MC68HC11 (Motorola), S80C552, S80C752 (Signetics), and others. Using a built-in A/D converter reduces the conversion time, reduces power consumption, and reduces parts count. A sampling schematic for use with a microcontroller with built in A/D is shown in FIG. 4, described next.

Referring now to FIG. 4, the sampling circuit first converts the FSR resistance to a voltage by means of a voltage divider, formed as follows. Each FSR 52, 54, 56, 58 has one side connected to a common node 110. A divider resistor 112 is connected between common node 110 and ground. Common node 110 is connected to an A/D input of keyboard microprocessor 100.

This fixed leg of the divider should be selected to be near the preloaded FSR resistance. If the preloaded FSR resistances (with no applied loads from a user's finger) are about 30K, for instance, the divider resistor 112 should be about 30K. Since the FSR resistance change is so great resistor is used, the tolerance of the divider resistor is not critical. If the microprocessor 100 has a ratiometric A/D (the MC68HC11 for instance), it is best, but not necessary, that the high and low voltage limits correspond to the maximum and minimum voltages from the divider. The FSR operating range is limited, so the voltage swing out of the divider will not be all the way to Vcc nor all the way to ground.

As shown, each FSR is enabled in turn by existing keyboard scan lines, designated KB Scanline 1 through KB Scanline 4. The particular arrangement shown assumes that the scan lines are normally low and pulse high long enough for the sample and hold in the A/D. It also assumes only one scan line will be high at a time. This is only required when reading the FSRs, not during normal scanning. For applications in which the keyboard uses normally high scanlines that pulse low, one could reverse the diodes and connect the divider resistor to Vcc instead of to ground.

It is of course also possible to use four A/D inputs and four divider resistors. This would eliminate the blocking diodes, any loading the FSRs may place on keyboard scan lines, and any loss of A/D range due to voltage drops.

The minimum series resistance of the FSR/divider resistor is generally high enough that loading is not a problem. An important consideration is the combination of voltage drops across the driver transistors in the keyboard microprocessor 100 and the voltage drops across the blocking diodes. These voltage drops can reduce A/D range by up to 1.4 volts.

Keyboard Microcontroller Software

Figure 5:
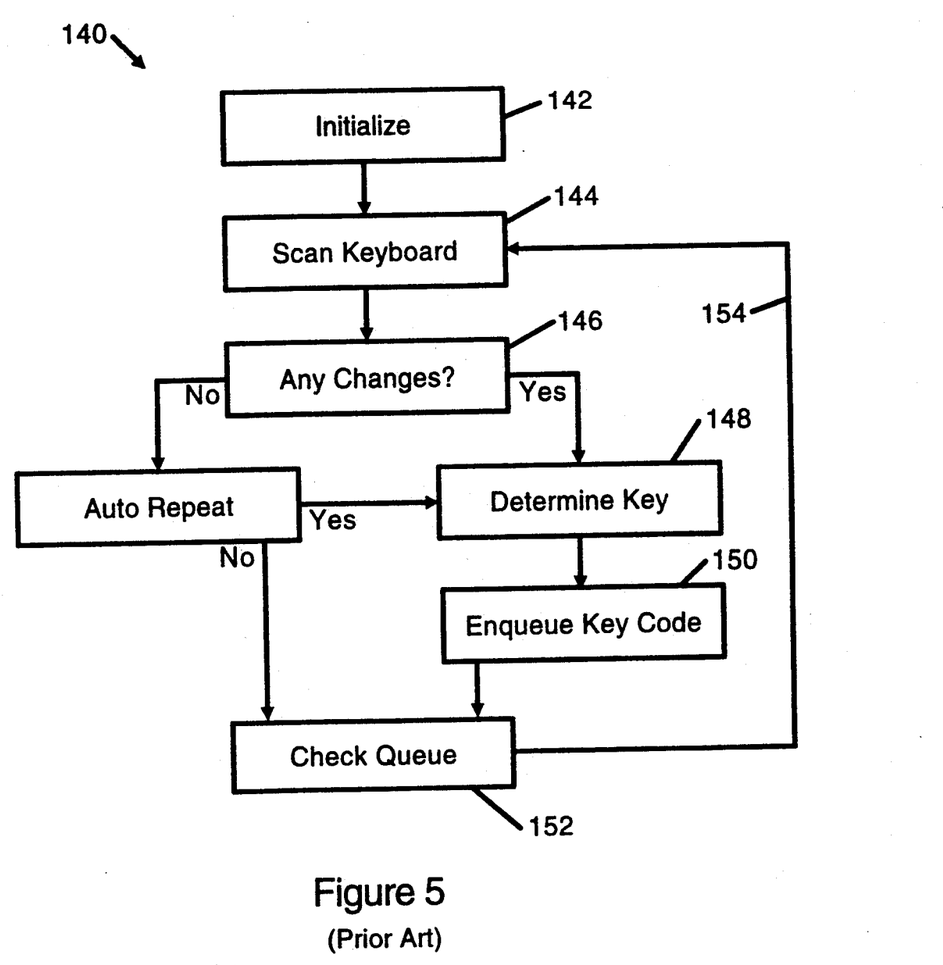
FIG. 5 is a flowchart of a main control loop of prior art alphanumeric keyboard software.

Known keyboard controller software is represented by the flowchart 140 shown in FIG. 5. This software handles acquisition and communication to the host of typing data only. Referring to flowchart 140, after initialization 142, the keyboard microcontroller scans the keyboard 144 and tests for changes in keyswitch states 146. If a change is detected, the key is determined 148, and enqueued 150. The microcontroller then checks the Queue 152 and transmits data, if necessary, to the host. Then the basic scan loop 154 is repeated.

Figure 6:
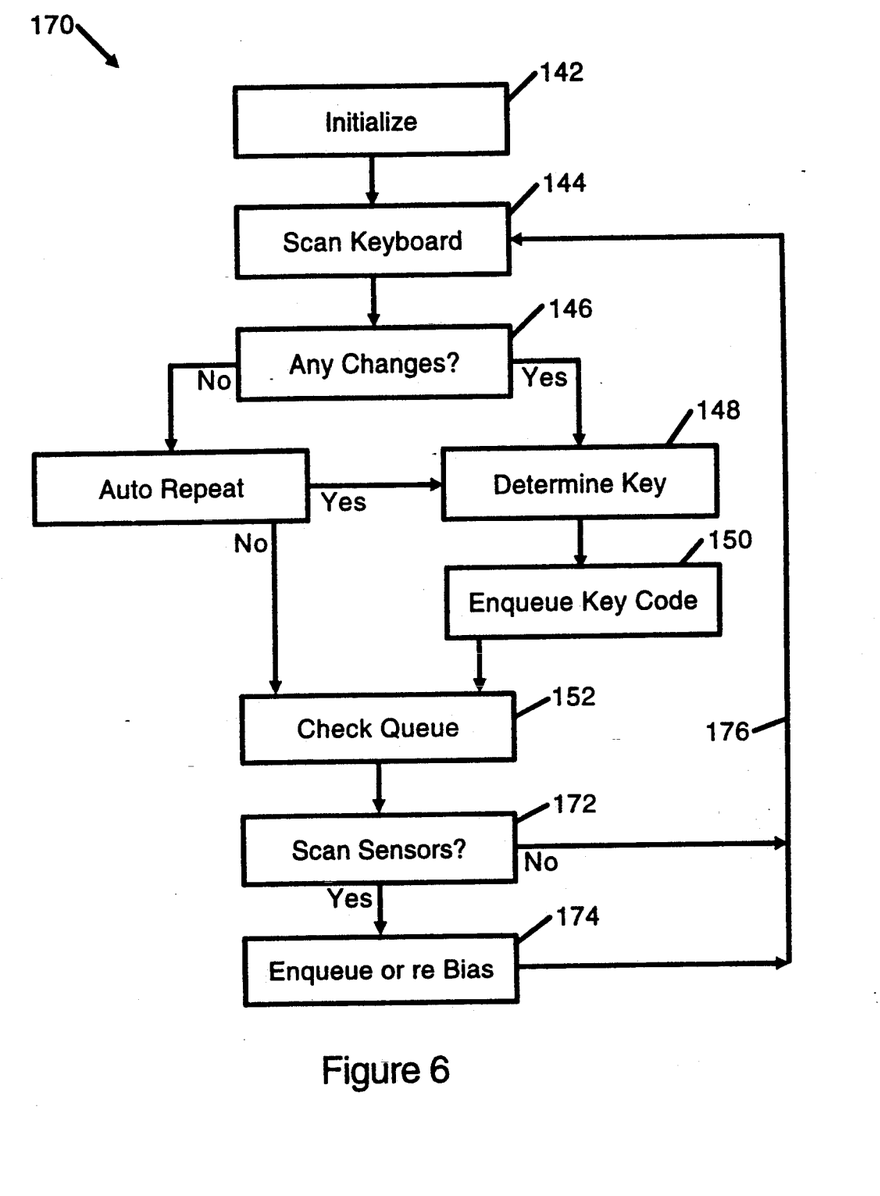
FIG. 6 is a flowchart of main control loop software of an integrated keyboard according to the present invention.

FIG. 6 shows a flowchart 170 of integrated keyboard operations according to the present invention. The upper portion of flowchart 170 is similar to the flowchart 140 of FIG. 5, the same reference numbers being used to identify common elements. The new flowchart 170, however, includes two additional steps following the check queue step 152, namely "Scan Sensors?" 172 and "Enqueue or re-Bias" 174.

Following check queue 152, the processor checks a scan timer flag (set by an interrupt routine) to see if it is time to read the A/D converter to determine force sensor values. If not, control returns, via loop 176, to resume the usual keyboard scanning for keystrokes.

On the other hand, if it is time to do so, the system reads the A/D to acquire force sensor data. Next, in step 174, the system checks a "rebias" flag to determine whether to transmit the force sensor data to the host computer in a data packet, or to use this data to update running bias values for each sensor. If rebiasing, the data is not enqueued. Running bias values are used to cancel drift in the sensors, as further described below.

New Keyboard Commands

The present invention requires that the keyboard microprocessor or microcontroller be arranged to respond to the following new commands from the host processor:

1. IDENTIFY

This command is used at host driver initialization time for the host to determine the keyboard hardware. The preferred command code is DC hex. The keyboard response is described in detail below.

2. START POINTING

A "start sending pointing sensor data" or more simply, start pointing command. The preferred command code is DA hex. The keyboard responds with an ACK, sends a bias values data packet, a pointing values data packet, and proceeds to send pointing values data packets periodically, preferably at 60 millisecond intervals. These data packets are described in detail below.

3. STOP POINTING

A "stop sending pointing sensor data" or more simply, stop pointing command. The preferred command code is DB hex. The keyboard responds with an ACK and stops sending pointing values data packets.

At all times the keyboard controller continues it's normal activities of scanning the key matrix and sending keycodes. (See FIG. 6.) The software on the host CPU is responsible for all mode change parsing and all key remappings. The keyboard microcontroller is only responsible for handling the three new commands above.

Figure 7:
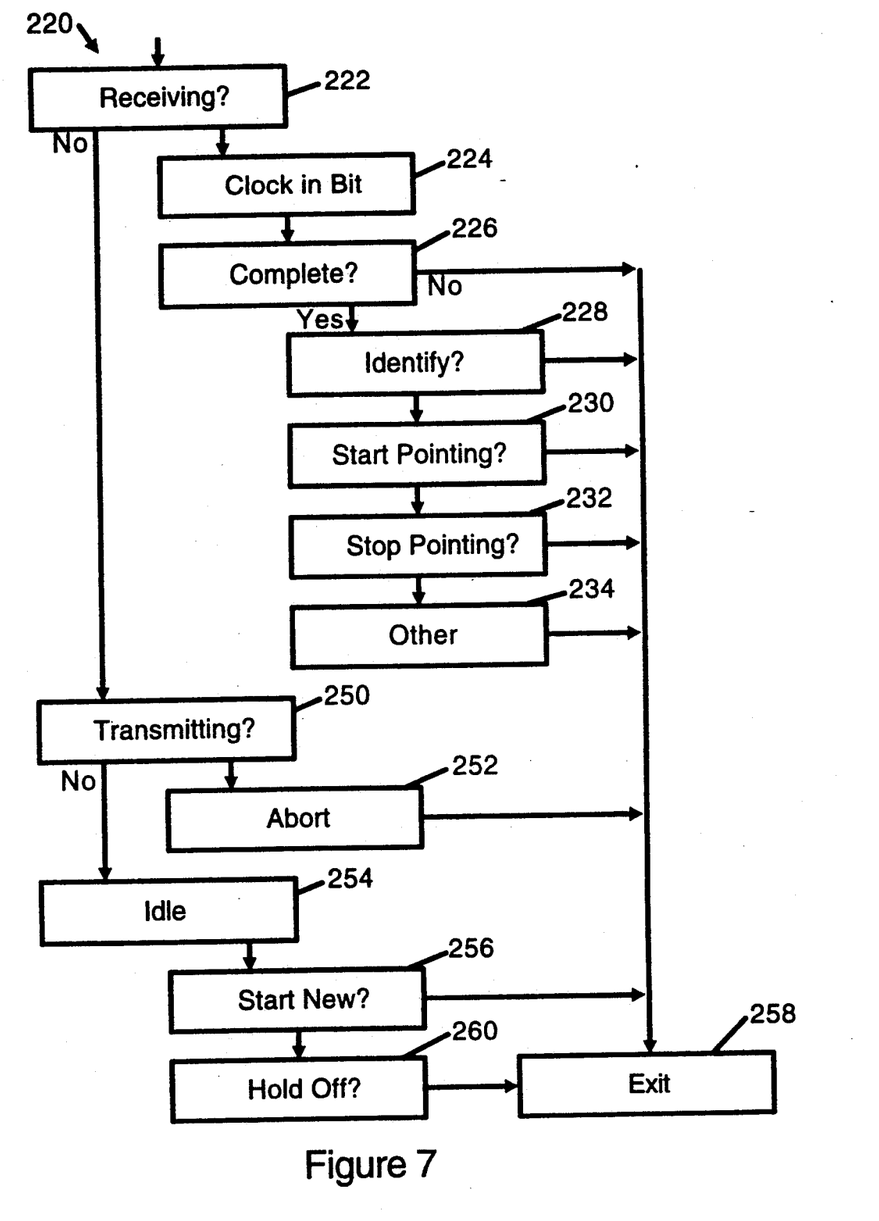
FIG. 7 is a flowchart of a communications interrupt handler for use in connection with the main control loop of FIG. 6.

Referring to FIG. 7, a flowchart 220 is shown to illustrate a communication interrupt handler. The communication interrupt handler preferably is implemented as part of the keyboard software, for communicating with the host processor. A communication interrupt occurs whenever a bit is ready on the communications port from the host computer.

In response to a communication interrupt, the keyboard processor first tests its internal status to determine if it is already receiving (222). If not, the processor tests (250) to determine if it is already transmitting. If the keyboard processor currently is neither receiving nor transmitting, the communication link is idle (254), and the processor next tests (256) to determine whether it is ready to start receiving a new command. If it is ready to start receiving a new command, the processor sets up to do so, and exits the communication interrupt handler (258).

In some keyboard-to-host communications methods, a "hold off" interrupt may occur when the host wishes to prevent the keyboard from starting to send anything. Test 260 tests for this standby status.

Referring back to the top of flowchart 220, if the keyboard system is already receiving when it detects the communication interrupt, it proceeds to clock in the pending bit 224, and then test whether or not the communication is complete 226. If not, control returns from the interrupt handler. This loop (222, 224, 226, 258) will be repeated in response to subsequent communication interrupts to receive subsequent bits until the complete communication, such as a keyboard command, has been received.

When the communication is complete, the keyboard processor examines the received command to identify it. If the received command is the IDENTIFY command, the processor queues up a reply string, and then exits the interrupt handler. If the received command is the START POINTING command 230, the processor sets a pointing flag, starts a scan timer and a bias timer, queues up a bias packet, and then exits. If the command is the STOP POINTING command, the processor clears the pointing flag and the scan timer, sets the bias flag, and then exits. If not, test for other commands 234 which are known in the prior art, and handle them accordingly.

Referring to decision 250, if the keyboard system was transmitting when the communication interrupt occurred, abort transmission 252 to receive the pending bit from the host.

These new features, preferably implemented in firmware, are designed to be as simple, modeless, and transportable as possible. A minimum amount of code space in the keyboard microcontroller is required, and the code does not have to change when the user interface is modified.

The IDENTIFY Command

The IDENTIFY command identifies the keyboard as being a multi-function keyboard, i.e. one having integrated typing and pointing mode capabilities. This allows the host software to make sure that it can work with the software in the keyboard.

The keyboard response to the IDENTIFY command preferably comprises a seven byte sequence. The first byte is a standard ACK (FA), and the second byte is DC hex to identify the response as being from the DC command. The third and fourth bytes are keyboard software version numbers. The fifth byte indicates the sensor type and configuration, while the sixth and seventh bytes identify the key that is physically to the left of the 'A' key on the keyboard (the normal break sequence for the key to the left of A is sent).

The software version is returned in two bytes. Both are encoded values. The first byte is the major software version plus 85 hex. The second number is the minor software version plus 85 hex A software version of 1.02, for example, would map to encoded software version bytes of 86 87. 85 hex is added to ensure the host keyboard port does not remap the values. Version number codes may range, for example, from 85H to E9H, a range of 100 decimal.

The sensor configuration tells the host software what to expect from the sensors, how many there are, etc. It, too, is encoded by adding 85 hex. For example, an 85 (hex) may be used to indicate four FSR sensors under the J key, one in each of the four corners of the key cell. An 86 may indicate four FSR sensors under a dedicated key that emits 6F/EF when pressed and released. Again, the sensors are in the corners of the key cell. Other codes may be used to identify other sensor configurations, for example three FSR sensors instead of four, as well as to identify other arrangements, such as four sensors orthogonally arranged in line with the keyswitch array matrix.

The key to the left of A is identified so that it can be used for explicit mode change operations by the user. Details of both explicit and implicit (automatic) mode change are described in the commonly-owned applications referenced above, respectively. On PC/AT TM keyboards, this key is usually the CONTROL or the CAPS LOCK key. The upcode sequence (F0 nn) is sent so the host does not mistake the code for a keypress (a mistaken key release is less hazardous).

A typical response to an IDENTIFY command is as follows:
Keyboard Sends: FA DC 86 85 85 F0 58
Host Sees: FA DC 86 85 85 BA The data is interpreted as follows: "Yes, this is an integrated keyboard" (FA DC); "the keyboard software version is 1.0" (86 85); "the sensor configuration is type 0" (85); and "the key to the left of a is caps lock" (F0 58 maps to BA, or CAPS LOCK up in a standard IBM TM PC/AT TM or compatible system).

Timing Data Acquisition and Communication

Figure 8:
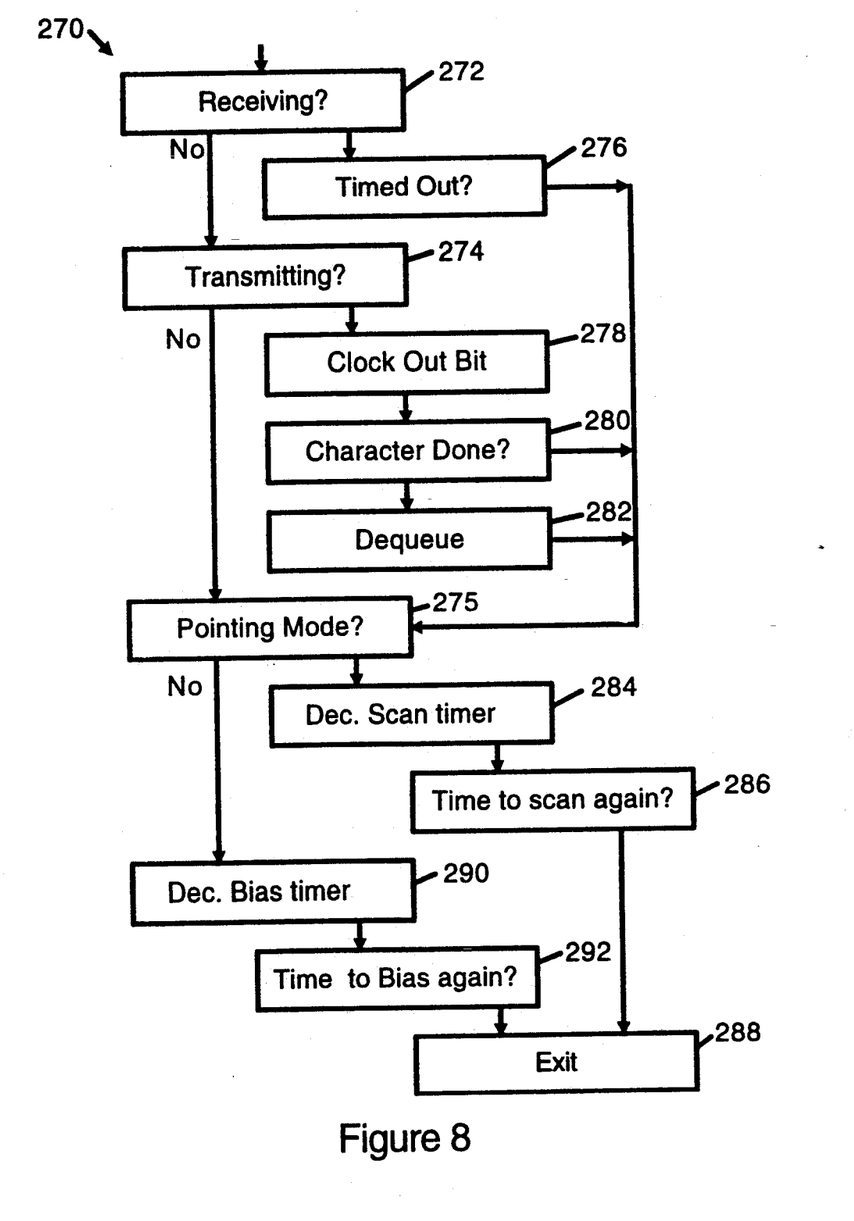
FIG. 8 is a flowchart of a timer interrupt handler for use in collection with the main control loop of FIG. 6.

FIG. 8 is a flowchart 270 of a timer interrupt handler for implementing the present invention. A timer interrupt occurs at a regular predetermined interval, usually triggered by an internal countdown timer feature in the keyboard microprocessor. In the prior art, a timer interrupt handler checks internal status (whether or not the system is currently sending or receiving) and typically performs actions related to communications. These functions are illustrated in the top part of flow chart 270, blocks 272, 274, 276, 278, 280 and 282.

If the system is not currently receiving 272, it tests for transmitting 274. If not transmitting, it tests for pointing mode 275 by checking the pointing flag (see 230 in FIG. 7). If pointing mode, a "packet-to-packet" or pointing count down timer is decremented 284. This is used to pace transmission of sensor data packets, as follows.

Next, the pointing count down timer value is examined 286 to determine if it is time to scan the sensors again, indicated by the pointing count down timer reaching a predetermined value. If so, the system sets the SCAN FLAG and clears the BIAS FLAG. If it is not yet time to scan again, exit 288.

Alternatively, if the system is not pointing (275=NO), a re-bias count down timer is decremented 290 in response to the timer interrupt. Next, the re-bias count down timer is examined 292 to determine if it is time to scan the sensors to update bias values, indicated by the re-bias timer reaching a predetermined value. If so, the system sets the SCAN FLAG and sets the BIAS FLAG. If not, exit 288.

The keyboard system thereby scans for new pointing data at a first predetermined frequency during pointing mode, and scans for new sensor bias data at a second predetermined frequency during a non-pointing (typing) mode. The SCAN FLAG indicates that data needs to be acquired by the main loop shown in flowchart 170. The BIAS FLAG indicates that the data should be used to update the bias values if set and that the data should be sent to the host if cleared. The count down timers are reset when they reach their terminal values.

Reading the A/D for Sensor Values

The reading of the sensor values is highly dependent on the sensor type used, the microprocessor type, and the A/D hardware (on-chip, or one of several discrete methods). For a typical Intel 8048 class microcontroller and a four-element FSR sensor, the A/D typically is a simple "how long does it take to charge a capacitor" type (see FIG. 3). The scanning is done in a two instruction loop, so the time for each channel is about 10+(2 * 214) or 438 instructions per channel (as described later, the data values range from 0 to 213, so there are 214 possible values for each sensor). Considerably less time is required if a timer input or a built in A/D converter is used (see FIG. 4).

Determining the Sensor Bias Values

If FSR sensors are used, it is important to have an idea of the values from the A/D when the pointing key is not being used. This is because the FSR sensors are preloaded approximately to the middle of their operating range (and the middle of the A/D range), for example by a spring assembly, and any forces applied by the user tends to load some of the FSRs and unload other of the FSRs. As a user applies forces to the keycap, some sensor readings go up, and others go down. Typical non use, idle readings are generally around 100 to 120 out of a possible 214.

The preload is variable over an appreciable range (plus or minus ¼th, or 25% maximum), and to correct for manufacturing tolerances and long term drift, the host software deducts the no-load sensor readings from the in-use (pointing) sensor readings to get a net force indication. The keyboard is responsible for gathering the no-load (bias) readings.

At initialization time, and periodically (every 5 minutes to 15 minutes) thereafter, the keyboard needs to read the individual sensor values and individually average them. Each sensor reading should be ignored if it is more than 12.5% (1/8th) or so different from it's running average. If possible, a reading should be ignored if the pointing key is operated within some short period of time (1 second or so) before or after the reading. This should not be necessary if the running average contains sufficient terms (if the effect of a new reading is weighted so as to not allow it to change the average by more than a certain amount, 1/8th or so).

The sensor bias (no-load) values are accumulated and sent at the start of every pointing session. Bias value data packets may have the same format as pointing values data packets with the exception of an identifying field in the second byte. The host detects the presence of a bias value data packet and updates the host software's internal bias values.

At power-up, the keyboard controller reads the initial null point values and establishes the basis bias values. When the keyboard is told to enter pointing mode and begin scanning, it, first sends a data packet which contains the force sensor bias values. This allows the host software to correct for drift due to aging and for variability between keyboards. The flags byte on a null point values packet begins with hex A instead of 9.

Sending Sensor Data Packets

When the keyboard receives the command to begin sending sensor data packets (DA), it does the following:

1. Responds with an ACK (FA), as with any other command (set typematic, set/reset mode indicators, etc.).

2. Send a bias values packet. This is done by enqueuing a bias values packet for automatic transmission.

3. Read the A/D and send a painting values packet. This is effected by setting the scan flag and clearing the bias flag. Later sensor values packets are then effected by setting the pointing mode flag and resetting the scan timer.

4. At the same time, continue scanning the key matrix, processing keys, and sending keycodes.

5. Periodically, for example every 60 milliseconds, plus or minus 10 milliseconds (15 times a second) read the A/D again and send a painting values packet. The repeatability of the time between readings is important-variations will affect the cursor speed.

A sensor data packet is 6 bytes long for sensors with 4 elements. The first byte is an identifier byte of DA, which lets the host know that the next 5 bytes are sensor data, not keycodes (once the DA is sent, nothing should be sent for the next 5 bytes but sensor data). The host will attempt to interpret the next 5 bytes as sensor data, however, if it sees an erroneous value (a value less than 85 hex or greater than F nex) it will go back to treating the codes from the eyboard as keycodes, starting with the erroneous d code.

There are two typ of sensor data packets: bias value packets and pointir values packets. They differ only in the high nibble of the flags byte (hex A for bias values and hex 9 for data values).

The 6-byte packets are arranged as follows:

First Byte: The identifier byte. The value is DA hex. This identifies the start of a reply packet. This is a reserved keycode for the IBM ™ PC/AT ™.

Second Byte: The flags byte. The upper 4 bits identifies the packet as being a pointing values or bias values packet, and the lower 4 bits are data value encoding flags, one for each sensor.

If the upper nibble is 9 hex, the packet is a pointing values packet. If the upper nibble is A hex, t packet is a bias values packet.

The lower 4 bits are flags that indicate which half of the encoding the following data values are from. For 4 element FSR sensors using the 4 corners of the key cell, the NE flag is bit 3, NW bit 2, SW bit 1, and SE bit 0. This corresponds to the order in which the following data bytes are sent.

Last four bytes: For the last four bytes, the data is encoded as indicated in the following 'C' pseudo code:

```
if(value < 0X6B) {
    encoded = value + 0X85; /* make start at 85H */
    clear corresponding bit in flags byte
}
else if(value < 0XD6) {
    encoded = value + OX1A; /* make start at 85H */
    set corresponding bit in flags byte
}
else{
    encoded = 0XEF; /* limit to max data value */
    set corresponding bit in flags byte
}
```

Raw sensor values from 0 to 6A hex (0 to 106 decimal) are mapped to encoded data values of 85 hex to EF hex, with the corresponding bit in the flags byte cleared. Raw sensor values from 6B to D5 hex (107 to 213 decimal) are mapped to encoded data values of 85 to EF hex as well, but the corresponding bit in the flags byte is set instead of cleared.

Note that this encoding maps the sensor values to innocuous codes that are not remapped by the host AT keyboard port (8042) hardware. The codes used range from 0×85 to 0×EF. Values outside this range are typically used or remapped by the 8042. This encoding allows passing raw data values from 0×00 to 0×D5 (0 to 213) for a total of 214 possible data values.

Third Byte: encoded value of NE sensor
Fourth Byte: encoded value of NW sensor
Fifth Byte: encoded value of SW sensor
Sixth Byte: encoded value of SE sensor The keyboard A/D hardware maps low FSR resistances (high forces) to high values and high FSR resistances (low forces) to low values. The foregoing encoding requires the 8042 keyboard controller to pass these upcodes unmodified.

An illustrative set of interactions with the keyboard is the following:

| From Host: | From Keyboard: |
|---|---|
| DC | FA DC 86 85 85 F0 58 |
| DA | FA |
|  | DA A0 C5 C0 C8 C6 |
|  | DA 91 89 C0 D8 C5 |
|  | DA 90 C5 C0 C7 C6 |
|  | . |
|  | . |
| DB | FA |

Sampling Rate

We have found 15 samples per second to be a useful sampling rate. This encoding thus requires 90 characters per second. The "human loop" delay in this system, i.e. delay for a user to observe an action on the screen (cursor motion or position) and move his or her finger (press the pointing key) to effect a response to the observation is on the order of 400 milliseconds. The sampling rate should be at least sufficient to not add to the human loop delay. A minimum sampling rate for good performance therefore is about four samples per second. Faster sampling improves visual feedback to the user of cursor motion. The cursor motion has a smoother appearance to the user at a sampling rate of, for example, 20 samples per second. That translates to a pointing mode sensor data rate of 20 times 6 or 120 bytes per second. For some applications, this rate may be limited by the communication link bandwidth. Such a limitation may be overcome by using one or more of the following techniques.

1. "Double up" data packets using a single byte command.

2. Encode only the difference in the sensor data value since the last packet. In other words, send only a delta value, rather than a absolute value. This can be done in a smaller packet, thereby reducing the data rate proportionately.

3. Use of a special code, one byte long, to indicate a repeat of a preceding byte. A "repeat byte" also is useful to reduce the amount of data required and therefore reduce the necessary bandwidth.

Figure 9:
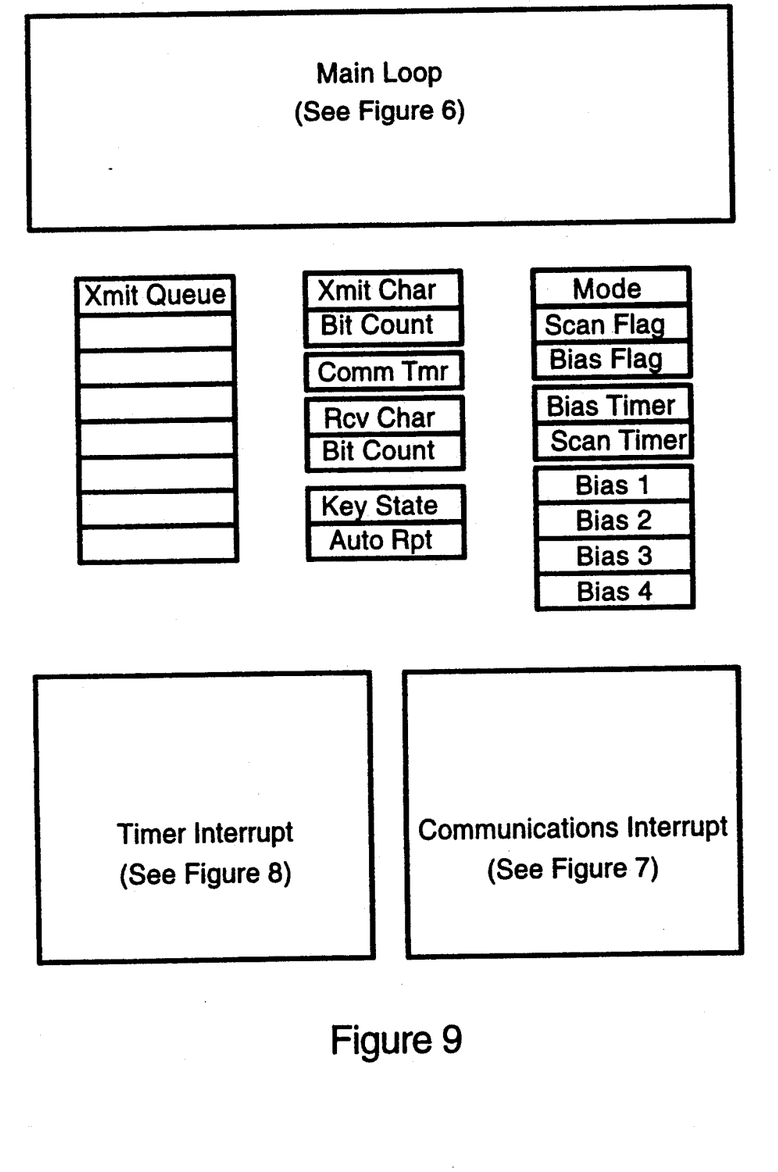
FIG. 9 is a conceptual diagram illustrating the hierarchical relationship of the main control loop of FIG. 6, the interrupt handlers of FIGS. 7 and 8, and pertinent memory locations.

FIG. 9 is a conceptual diagram, showing the methods illustrated in the preceding figures surrounding the various shared data items, shown in the middle. These data items are defined in the following Table:

| Abbreviation | Definition |
|---|---|
| Key State | Keyboard key scan state |
| Auto Rpt | Auto Repeat State |

-continued

| Abbreviation | Definition |
|---|---|
| Xmit Queue | Transmit Queue |
| Xmit Char | Transmit Character |
| Rcv Char | Receive Character |
| Comm Tmr | Communications Timer |
| Mode | keyboard mode flag, i.e. typing or pointing |
| Scan Flag | The flag to indicate to the main loop (FIG. 6) that a sensor scan should be done. |
| Bias Flag | The flag to indicate whether the scanned sensor data should be transmitted or used to auto bias. |
| Bias Timer | The timer for the control of bias data scanning. Invented art. |
| Scan Timer | Timer for packet to packet sensor data timing. Invented art. |
| Bias n | Storage for the sensor bias values, one for each sensor. |

Sensor Bias Values

The keyboard controller stores bias value for each FSR to allow for drift correction. Periodically during typing mode, the keyboard controller will read the FSRs and update the bias values. For each sensor, the new bias value will be averaged into a running bias value unless the new bias value is different by more than 12.5% (1/8th). If the difference is more than 12.5%, the new bias value will be assumed to be in error. The keyboard controller will also ignore new bias values that are taken within a few seconds of the pointing (J) key being pressed.

Host Driver Software

The Host Driver Software reads the keyboard port, parsing mode changes between typing and pointing. While in pointing mode, the driver provides a mouse interface.

While in typing mode, the driver has merely to examine the keyboard data stream for the sequences that indicate a change to pointing mode. If the keyboard data is anything else (typing data), it is processed in the normal way.

If the keyboard data indicates a change to pointing mode, the driver tells the keyboard to begin sending A/D data, as described above, and proceeds to interpret the keyboard data accordingly. Each sensor data packet is unpacked and the reassembled sensor data bytes are used by a special tracking algorithm to move the cursor.

Key press and release information is used in pointing mode to emulate mouse buttons (preferably the F, D, and S keys, though any keys could be used) and to provide useful new pointing device features. New features include real time cursor speed range changing and useful keys such as INSERT and DELETE remapped to keys that are reachable from the home row. Selected other keycodes may be processed as in typing mode. Most other keycodes are thrown away.

While in pointing mode, the driver parses for mode changes back to typing mode. When one is found, the keyboard is told to stop sending sensor data (by sending a DB hex command).

Mode changes may be requested, for example, by the following key sequences (where "LOA" means key to the left of 'A'): {LOA down, J down, LOA up}=enter temporary pointing mode; {J up} then means leave pointing mode. {ALT down, J down, ALT up}=enter locked in pointing mode; {ALT down, J down}=leave locked in pointing mode. Alternatively, special methods may be used to determine if presses of the pointing key are attempts to type or attempts to point (automatic mode change). Note that the keyboard does not have to parse these transitions.

While pointing, the F key is the primary mouse button; D is the secondary mouse button; and S is the third mouse button. Various other keys are remapped under user control: G is DEL; E is INS; Q is ESC; V is slow down cursor movement; and SHIFT-V is speed up cursor movement. The ENTER, SHIFT, CONTROL, ALT, and CAPS LOCK keys are processed normally. All other keys are ignored. Preferably, the Host Driver software is user configurable as to key placements and mode changes.

Keyswitch Chording

An integrated system according to the invention may use one or more unusual key chordings not commonly encountered in normal typing. It is important, therefore, that no ghosting or lockout occur during these chordings.

To illustrate, the J key is depressed during all pointing operations. The F and D keys are used as mouse buttons, so J, F, and D may all be pressed at the same time. J may also be pressed in conjunction with Tab, Q, W, E, R, T, A, S, G, Z, X, C, V, and B, as well as the normal chording keys, the space bar, and the Enter key. Virtually any other keys may be employed in chords for other purposes.

Host Keyboard Port 8042 Requirements

All the added multi-functional keyboard related communications use keyboard port data values in the range of 85 to EF hex. Normally, these are upcodes. The keyboard, however, is not sending the "up" prefix (F0 hex) prior to these values; it just sends the values. The host computer's 8042 keyboard port must not remap values in this range.

It is a requirement that if the keyboard sends an 85, the keyboard port gives the host an 85. If the keyboard sends an EF, the keyboard port must give the host an EF, and so on, for all values between 85 and EF hex.

Having illustrated and described the principles of my invention in a preferred embodiment thereof, it should be readily apparent to those skilled in the art that the invention can be modified in arrangement and detail without departing from such principles. For example, the particular encoding scheme described is but an operative example. The functions described can be variously implemented in other combinations of software, firmware and hardware still within the scope of the invention. We claim all modifications coming within the spirit and scope of the accompanying claims.

We claim:

1. A method of acquiring pointing data and alphanumeric typing data in an integrated keyboard coupled to a host processor, the keyboard having an array of typing keyswitches including a multi-purpose pointing key and a plurality of force sensors coupled to the pointing key, the method comprising the steps of:

providing means in the keyboard for selecting one at a time of a typing mode of operation for acquiring typing data and a pointing mode of operation for acquiring pointing data;

when the keyboard is not in pointing mode, periodically scanning each of the force sensors to acquire a corresponding analog force sensor bias value; and deducting each force sensor bias value from the corresponding force sensor pointing value acquired during a pointing operation to determine respective new force values, thereby correcting for preloading of the force sensors.

2. A method according to claim 1 including:

storing the force sensor bias values;

periodically repeating said scanning to acquire new force sensor bias values; and after each scan of the force sensors to acquire new bias values, updating the stored force sensor bias values in response to the new bias values.

3. A method according to claim 2 wherein said updating step includes computing a running average of each force sensor bias value, and replacing each of the stored force sensor bias values by the corresponding running average, thereby correcting the stored bias values for long-term drift and temperature sensitivity of the force sensors.

4. A method according to claim 3 wherein said computing each running average includes ignoring a new bias value that varies by more than a predetermined percentage from the corresponding running average bias value.

5. A method according to claim 1 wherein periodically scanning the force sensors includes:

monitoring a timer interrupt input to detect periodic timer interrupt signals; and pacing said scanning step by counting the timer interrupt signals during typing mode, thereby scanning the force sensors in typing mode at a second predetermined frequency proportional to the timer interrupt signal frequency.

6. A method according to claim 1 wherein said scanning the force sensors is repeated periodically in a range of up to approximately every 15 minutes.

7. A method of acquiring pointing direction data, mouse button emulation data and alphanumeric typing data in an integrated keyboard coupled to a host processor, the keyboard having an array of typing keyswitches including a multi-purpose pointing key and a plurality of force sensors coupled to the pointing key, the method comprising the steps of:

providing means in the keyboard for selecting one at a time of a typing mode of operation for acquiring typing data and a pointing mode of operation for acquiring pointing data, wherein pointing data includes both pointing direction data and mouse button emulation data;

for each force sensor, storing a respective bias value in the keyboard;

regardless of the selected mode of operation, periodically scanning the force sensors to acquire respective force sensor values;

during the typing mode of operation, updating the stored bias values responsive to the acquired force sensor values without transmitting the acquired force sensor values to the host processor;

during the pointing mode of operation, transmitting the acquired force sensor values to the host processor as pointing direction data for cursor control, without updating the stored bias values;

regardless of the selected mode of operation, periodically scanning the keyswitch array to detect a change in keyswitch state, so that keyswitch actions are captured even while pointing with the pointing key; and if a change in keyswitch state is detected, transmitting a keycode representative of the detected keyswitch state change to the host processor, so that the transmitted keycodes may be used as typing data in the typing mode of operation and may be used to emulate mouse button actions in the pointing mode of operation, whereby the integrated keyboard obviates a separate mouse.

8. A method according to claim 7 further comprising:

providing a scan flag to schedule acquisition of force sensor data;

providing a bias flag to schedule updating the stored bias values;

periodically setting the scan flag at a predetermined frequency to indicate time to scan the force sensors, thereby periodically acquiring current force sensor values;

after each scan of the keyswitch array, checking the scan flag for an indication to scan the force sensors;

if the scan flag does not indicate time to scan the force sensors, repeating said scanning the keyswitch array;

checking the bias flag for an indication of whether to update the stored bias values; and if the bias flag does indicate time to update the stored bias values, updating each of the stored bias values responsive to the corresponding current force sensor value without transmitting the current force sensor values to the host processor.

9. A method according to claim 7 wherein said selecting means includes a mode flag and providing a scan flag to schedule acquisition of force sensor data includes:

providing a mode flag in the keyboard for indicating one of a typing mode and a pointing mode of operation of the keyboard;

providing a scan timer for tracking elapsed time;

providing a periodic timer interrupt signal at a predetermined frequency;

responsive to each timer interrupt signal, if the keyboard is not then transmitting data to the host processor, checking the state of the mode flag to determine a current mode of operation;

if the current mode is pointing, decrementing the scan timer;

checking the scan timer to detect a predetermined time limit; and if the time limit is detected, setting the scan flag to initiate scanning the force sensors and clearing the bias flag, thereby indicating that acquired force sensor data is to be transmitted to the host processor.

10. A method according to claim 9 further comprising:

providing a bias timer for tracking elapsed time;

responsive to each timer interrupt signal, if the current mode is typing, decrementing the bias timer and checking the bias timer to detect a predetermined time limit; and if the time limit is detected, setting the scan flag to initiate scanning the force sensors and setting the bias flag to indicate that acquired force sensor data be used to update the stored bias values and not transmitted to the host processor.

11. A method according to claim 7 further comprising:
providing a mode flag in the keyboard for indicating one of a typing mode and a pointing mode of operation of the keyboard;
responsive to a communication interrupt signal from the host processor, receiving a command from the host processor;
if the received command is a predetermined start pointing command, setting the mode flag to enter the pointing mode of operation and enqueuing a bias packet of data for transmission to the host processor, the bias packet of data comprising the stored force sensor bias values, so that the host processor can deduct the stored bias values from current force sensor values subsequently transmitted to the host processor.

12. A method according to claim 11 further comprising:
responsive to the start pointing command, periodically setting the scan flag at a first predetermined frequency, thereby initiating periodic scanning of the force sensors at the first frequency; and
clearing the bias flag so that current force sensor data will be transmitted to the host processor.

13. A method according to claim 11 further comprising:
if the received command is a predetermined stop pointing command, setting the mode flag to enter the typing mode of operation and setting the bias flag for updating the stored bias values during the typing mode of operation.

14. A method according to claim 11 further comprising continuing during the pointing mode of operation to scan the keyswitch array and to transmit keycodes to the host processor identifying keyswitch state changes, thereby allowing keyswitches in the array to be used for emulating mouse buttons for clicking and dragging operations.

15. A method according to claim 7 wherein the integrated keyboard is coupled to the host processed through a keyboard port, and further comprising the steps of:
responsive to a communication interrupt signal from the host processor, receiving a command from the host processor;
if the received command is a predetermined identify command, enqueing a keyboard identification data packet for transmission to the host processor, the identification data packet comprising
an indication that the keyboard is an integrated keyboard;
a keyboard software version identification number; and
an indication of the number of force sensors coupled to the pointing key and their geometric configuration; and wherein the keyboard software version identification number is offset by a predetermined binary offset, the offset being selected so that the keyboard port does not attempt to remap the keyboard software version number before providing it to the host processor.

16. A method according to claim 15 wherein the identification data packet further includes identification of a keyswitch immediately to the left of the letter-A key in the keyboard array, so that the said keyswitch to the left of the letter-A key may be recognized by the host processor for explicit mode change operations.

17. An integrated keyboard for acquiring both typing and pointing data, the keyboard comprising:
an array of keyswitches, one of the keyswitches being designated as a pointing key for both typing and pointing operations;
a plurality of force sensors coupled to the pointing key to sense forces applied to the pointing key by a user;
microcontroller means in the keyboard for both typing and pointing data acquisition, the microcontroller means having a built-in A/D converter and A/D input for receiving an input voltage for conversion to digital data;
the microcontroller means further including a plurality of scan lines coupled to the array for scanning the array;
means coupling a predetermined one of the keyboard scan lines to each of the force sensors for selectively enabling the force sensors, one at a time, under control of the microcontroller means, so as to provide a corresponding input voltage to the A/D input during the pointing mode of operation;
memory means coupled to the microcontroller means for storing a respective force sensor bias value for each one of the force sensors;
software means for controlling the keyboard microcontroller means so as to periodically scan the force sensors and read the A/D converter to acquire corresponding force sensor values during the typing mode of operation, thereby acquiring bias values for each of the force sensors; and means for writing the bias values into the memory means as stored bias values.

18. An integrated keyboard according to claim 17 further comprising:
means responsive to the pointing mode of operation for reading the A/D converter to acquire corresponding force sensor values and for encoding each of the force sensor values so as to prevent subsequent remapping of the force sensor values by a host computer keyboard communications port;
communication means for operatively connecting the integrated keyboard to a host computer; and
means responsive to the pointing mode of operation for transmitting the encoded force sensor values to a host computer over the communication means as a series of bytes, each byte being a representation of a respective one of the encoded force sensor values; and
means for transmitting detected keyswitch state changes to the host computer over the same communication means during both modes of operation, so that keyswitch state changes detected during the pointing mode of operation may be used by the host computer to emulate mouse button state changes, whereby all of the keyswitches in the keyboard are available for mouse button emulation.

* * * * *

UNITED STATES PATENT AND TRADEMARK OFFICE
CERTIFICATE OF CORRECTION

PATENT NO. : 5,252,971
DATED : October 12, 1993
INVENTOR(S) : Franz et al.

It is certified that error appears in the above-indentified patent and that said Letters Patent is hereby corrected as shown below:

| | |
|---|---|
| Column 2 | Line 36, change "collection" to --connection--; |
| Column 5 | Line 57, change "A D" to --A/D--; |
| Column 6 | Line 13, after "great" insert ---and a common divider--; |
| Column 8 | Line 50, change "hex" to --hex.--; |
| Column 10 | Line 66, change "painting" to --pointing--; |
| Column 11 | Line 7, change "painting" to --pointing--; |
| Column 11 | Line 33, change "t" to --the--; |
| Column 15 | Line 9, change "new" to --net--; |
| Column 17 | Line 43, change "processed" to --processor--. |

Signed and Sealed this

Sixteenth Day of August, 1994

BRUCE LEHMAN

*Attest:*

*Attesting Officer*      *Commissioner of Patents and Trademarks*